J. M. GOODWIN.
Improvement in Dumping-Cars.
No. 130,424.
Patented Aug. 13, 1872.
2 Sheets--Sheet 1.
Fig. I.
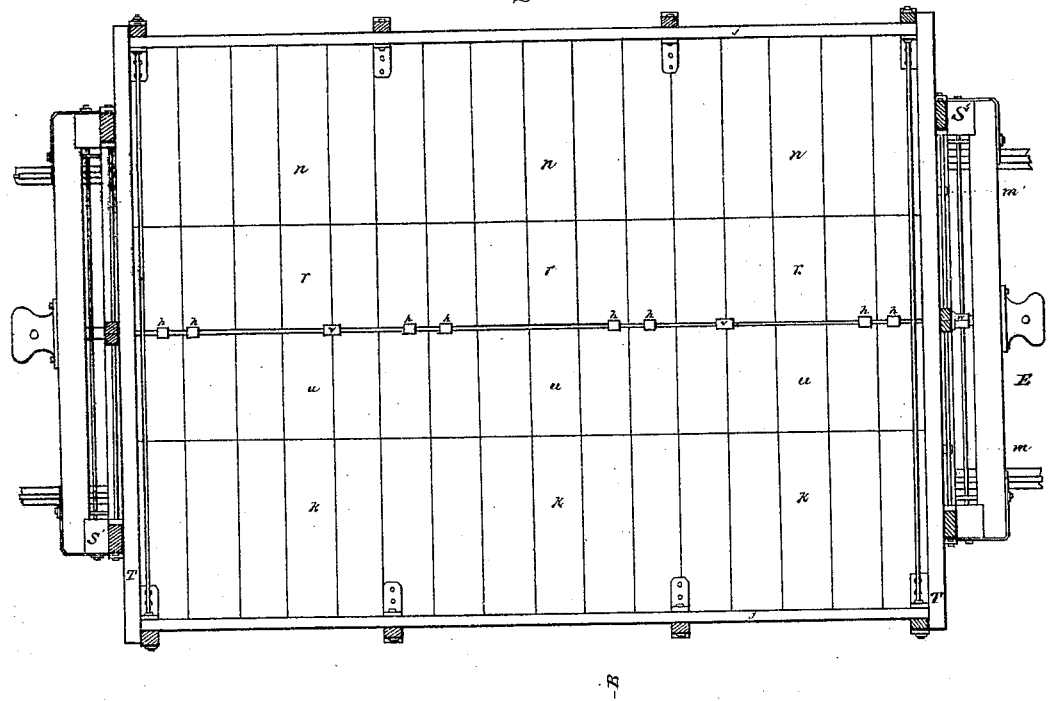
Fig. II.
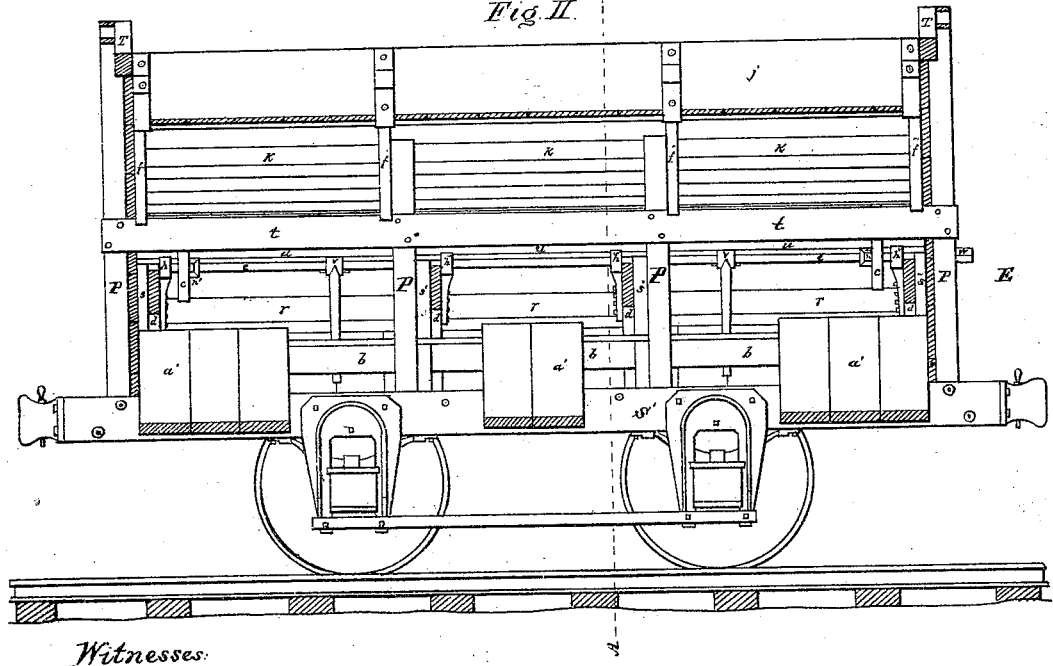
Witnesses:
Jos. M. Hall
T. Edwards Smith
Inventor:
John M. Goodwin J. M. GOODWIN.
Improvement in Dumping-Cars.
No. 130,424. Patented Aug. 13, 1872.
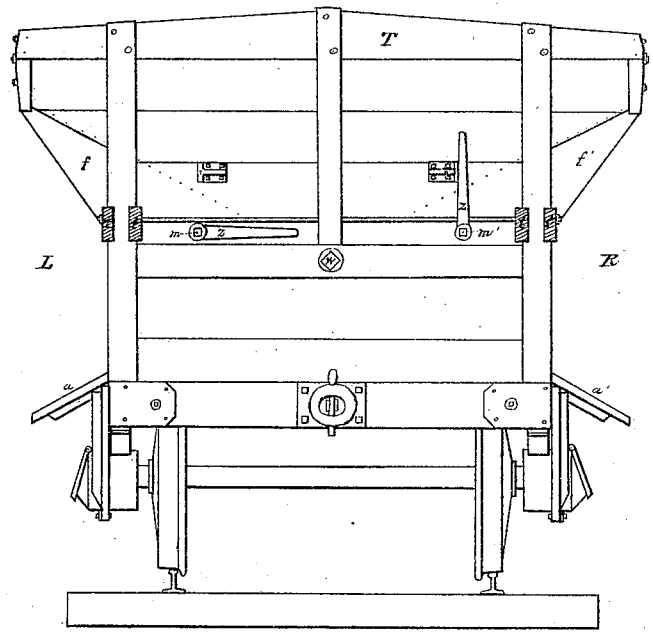
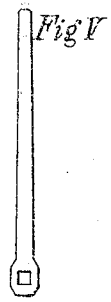
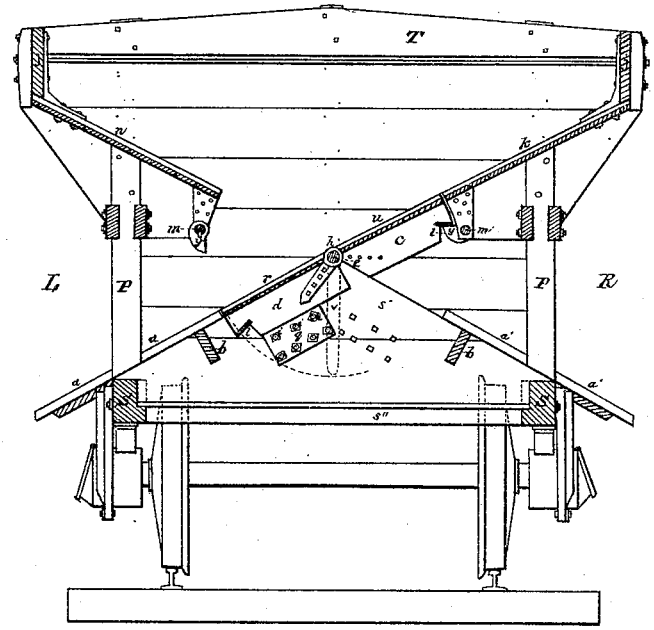

UNITED STATES PATENT OFFICE.

JOHN M. GOODWIN, OF CLEVELAND, OHIO.

IMPROVEMENT IN DUMPING-CARS.

Specification forming part of Letters Patent No. 130,424, dated August 13, 1872.

*To all whom it may concern:*

Be it known that I, JOHN M. GOODWIN, of Cleveland, in the county of Cuyahoga and State of Ohio, have invented a new and useful Improvement in Dumping Cars or Carriages to be used upon Railways or Wagon-roads, of which the following is a specification, reference being had to the accompanying drawing, made to a scale of one-half inch to one foot, that make part of this specification, and in which—

Figure I represents a plan of the car with both its valves in position to receive a load. Fig. II represents a side view of the car with one of its valves raised and one lowered, four pieces of flooring on each side of the middle of the car being removed to show the parts beneath. Fig. III represents an end view of the car with the rocker-shaft lever on the side R in the position occupied by it when the corresponding valve is raised, and the rocker-shaft lever on the side L in the position occupied by it when the corresponding valve is lowered. Fig. IV represents a section of the car or carriage on the line A B of Fig. II with the valve on the side R raised and the valve on the side L lowered. Fig. V represents the wrench-lever used in closing the valves of the car.

Dumping-cars are now in use in which the floors sustaining the load are inclined, either from the sides toward the middle of the car or from the middle toward the sides of the car, and in which the load is, upon the opening of certain valves, discharged by the action of gravity, either through openings or traps, entirely in the middle of the car or outward from the sides and half upon each side of the car. Other dumping-cars are in use in which the floor sustaining the load is inclined from one side entirely across the car, and in which the load is discharged by the force of gravity at the side of the car and all upon one side; and still other cars are now used that, when in process of loading, and while in motion, carry their floors in a horizontal position, but discharge their load upon either side of the car by tipping or careening the body of the car to one side or the other by means of rockers or radial arms upon which it rests.

The car above mentioned in which the floor is inclined from one side entirely across the car to the other side is, in some cases, made to discharge its load upon either side of the track or roadway, as desired, by rotating the body of the car upon a pivot or turn-table fixed in or upon its lower frame, thus presenting the inclination of the floor either to the one side or to the other side of the road or track; or, if desired, either before or behind the car.

In the transportation of gravel, sand, coal, ores, grain, and other articles that may be carried and unloaded in bulk, I have found it very necessary to provide a car which, first, shall discharge its entire load upon either side by the action of gravity and without any rotating, rocking, or careening, or any necessary movement of the body of the car; and which shall, second, be so constructed that its valves, when dropped in order to discharge a load or otherwise, shall in no way interfere with the running-gear of the car, nor with the passage of the car along the road or track on which it may be used; and so that in case of an accidental dropping of either of the valves, or of both of them at the same time while the car is loaded and in motion, no part of the valves nor of the car-body will be, by reason of such accidental displacement, any more liable to contact with the running-gear of the car, nor with the road or track, nor with objects upon or beside the road or track, than while in position to retain a load, and so that the load of the car in case of such accidental dropping of a valve, as well as when the load is intentionally dumped, shall be thrown upon the side of the track or roadway, entirely clear of said track and out of the way of any car passing along said track; and in constructing a car, the valves of which, when dropped or in position to discharge a load, "shall in no way interfere with the running-gear of the car nor with the passage of the car along the track," as specified in the foregoing paragraph. I have in view the advantage to be derived from being free from the necessity for closing the valves of the car immediately after unloading and before moving the car from the place of unloading, as well as the advantage of immunity from damage in case of accidental dropping of valves, as above described.

The production of a car or carriage possessing the characteristics aforesaid is the object of my invention.

The construction and operation of the car I describe as follows: Upon two sills, S S, Figs. I and IV, which are attached in the usual manner to the running-gear of the car, are placed triangular trusses, $s''$ $s''$, Fig. IV, and $s$ $s'$ $s''$ $s'''$, Fig. II. These trusses are notched into the sills, and, among other uses, serve as cross-beams and braces between the sills. Running lengthwise, one on each side of the car, are two girders, $b$ $b$ $b$, Fig. II, and $b$ $b$, Fig. IV, that support the upper part of two inclined floors, $a'$, Fig. II, and $a$ $a'$, Fig. IV, the lower parts of the floors resting upon the sills aforesaid, and extending over and beyond the same. Lying in semicircular sockets in the apex of each of the triangular trusses, before specified, is a rod of iron, $e$, Figs. II and IV, cylindrical in cross-section, that extends throughout the length of the car-body, and projects beyond the body at one of its ends, E, Fig. II. Upon the projecting end of this rod is formed a square head, W, Figs. I, II, and III, so that it may be conveniently seized and turned by a suitable wrench or lever, Fig. V. This rod forms a pivot for hinges, $h$ $h$ $h$ $h$, $h$ $h$ $h$ $h$, Fig. I, and $h$, Figs. II and IV, that are attached to the cleats $c$ $c$ and $d$ $d$ $d$, Fig. II, and $c$ and $d$, Fig. IV, of the valves of the car, which valves are composed of said cleats and their attached floors $u$ $u$ $u$, Figs. I and II, and $r$, Fig. IV. Keyed upon the said rods are two arms, $v$ $v$, Fig. II, and $v$, in dotted lines, Fig. IV. Let into the posts P P, Fig. IV, and P P P P, Fig. II, are purlines $t$ $t$, Fig. II, and $t$ $t$ $t$ $t$, Fig. IV, that support corbels $f$ $f$ $f$ $f$, Fig. II, and $f$ $f$, Fig. IV, and upon these corbels the upper floors $n$ $n$ $n$ K K K, Fig. I, and K and $n$, Fig. IV, are laid. At the outer and upper edges of the upper floors are set sideboards $j$, Fig. II, and $j$ $j$, Fig. IV, that are held in position by iron knees upon the inside, and by cleats upon the outside, and by the ties T, Figs. I, II, III, and IV, the whole being fastened and bound together by bolts, as indicated in the drawing. Each end of the car is closed by a bulk-head, as shown in the drawing and model herewith. Extending throughout the length of the car-body, and at one end thereof, E, Fig. I, projecting beyond the bulk-head, are two rocker-shafts, $m$ $m'$, Figs. I and III, that, at points opposite the cleats of the valves aforesaid, carry lugs $y$ $y$, Fig. IV. When the valves are raised, as shown on the side R of Fig. IV, the lugs just described are brought under the indentations $l$ $l$, Fig. IV, in the said valves by the operation of levers $z$ $z$, Fig. III, provided for that purpose, and the said levers being held in position by catches $x$ $x$, Fig. III, bolted upon the bulk-head, the valves are held in place to retain a load in the car.

All the floors in the car except those shown at $a'$ $a'$ $a'$, Fig. II, and $a$ $a'$, Fig. IV, are made double, the lower thickness being laid lengthwise of the car and the top thickness laid in the direction of the slip of the load in leaving the car.

The car being loaded, and it being desired to discharge the load upon the side L, (see Fig. IV,) for example, the lever $z$ on that side is pulled outward until it slips over the catch $x$, whereupon the weight of the load, bearing upon the lugs, (of which $y$, Fig. IV, is one,) causes the rocker-shaft $m$ to make a partial revolution, depressing the lugs into the position shown at $y'$ on the said side L of Fig. IV, and allowing the valve in the side L to drop. When, in falling, the top of the floor $r$ of the said valve reaches the line of the floor $a$ the stop $q$, which is fastened, by bolts $i$ $i$ $i$ $i$ $i$ $i$, Fig. IV, to the triangular truss $s''$, prevents the further fall of the valve, and the load descends along the floors $n$ and K and over the raised valve on the side R, and is deposited on the side L at a distance from the car sufficient (even when the ground is level and no provision made for receiving the load upon inclined floors) to insure the "clearing" of the car from which the load is dumped, and of other cars passing along the track. A similar manipulation of the opposite lever would cause the load to be deposited on the side R.

When it is desired to raise the valve after discharging a load the wrench-lever, Fig. V, is applied to the head W, Figs. I, II, and III, of the rod upon which $v$ $v$, Fig. II, and $v$, Fig. IV, are keyed, and that rod, revolving in its sockets, and in the hinges of both the valves, carries the arms up against the under side of the valve to be closed, and, by a continued pressure on the wrench-lever, the valve is raised to its place, to be secured by a manipulation (before reversely described) of the lever $z$.

The manner of constructing the car-body may be modified by making the valves of greater or less width; or by hanging them by hinges attached to the lower edges of the upper floors $n$ and K, at the same time extending inward the floors resting on the triangular trusses, in order to cover the space occupied by the valve on the side L and the space left vacant by the raised valve on the side R, as shown in Fig. IV, and giving these extended floors a curved surface so as to fit the sweep of the swinging valves. These modifications would not affect the relation of the valves and floors to each other, nor change the general direction and manner of discharge of the load.

It is obvious that when the valve is dropped to the position for discharging a load, as shown on the side L of Fig. IV, no part of the valve itself, nor of the car-body, is any more liable to contact with the track upon which the car runs, nor with any object upon or beside the track, than when the valve is in the position for retaining a load, as shown on the side R of Fig. IV. It is also obvious that the load discharged would fall outside of the track, and sufficiently far from it to clear any car passing on the said track.

What I claim is—

1. The improved dumping car or carriage, combining in its construction the valves (composed, respectively, of the cleats $c$ and $d$ and the floors $u$ and $r$) hinged upon the longitudinal rod $e$, and held in position or released, as required, by the lugs $y\ y$ upon the rocker-shafts $m\ m'$, the triangular trusses $s''\ s''$, and the inclined floors $a\ a$ and $a'\ a'$, and K and $n$, by the operation whereof, as hereinbefore specified, the entire load of the car will be discharged, by the force of gravity, from either side of the car, as desired, the whole constructed and operating substantially in the manner and for the purposes described.

2. The arrangement and application of the vibrating arms $v\ v$ keyed upon the longitudinal rod $e$, in combination with the valves of the car, constructed and operating substantially in the manner and for the purpose set forth.

JOHN M. GOODWIN.

Witnesses:
Jos. M. Hall,
J. Edwards Smith.